US009476172B2

(12) United States Patent
Georgakis et al.

(10) Patent No.: US 9,476,172 B2
(45) Date of Patent: Oct. 25, 2016

(54) CONSTRUCTION AND A TENSION ELEMENT COMPRISING A CABLE AND A PLURALITY OF STRAKES

(71) Applicant: Danmarks Tekniske Universitet, Lyngby (DK)

(72) Inventors: Christos Thomas Georgakis, Holte (DK); Kenneth Kleissl, Copenhagen (DK)

(73) Assignee: Danmarks Tekniske Universitet, Lyngby (DK)

( * ) Notice: Subject to any disclaimer, the term of this patent is extended or adjusted under 35 U.S.C. 154(b) by 0 days.

(21) Appl. No.: 14/409,790

(22) PCT Filed: Jun. 28, 2013

(86) PCT No.: PCT/EP2013/063655
§ 371 (c)(1),
(2) Date: Dec. 19, 2014

(87) PCT Pub. No.: WO2014/001515
PCT Pub. Date: Jan. 3, 2014

(65) Prior Publication Data

US 2015/0152611 A1 Jun. 4, 2015

(30) Foreign Application Priority Data

Jun. 28, 2012 (EP) .................................... 12174090

(51) Int. Cl.
*E01D 11/00* (2006.01)
*E01D 19/16* (2006.01)
(Continued)

(52) U.S. Cl.
CPC ............... *E01D 19/16* (2013.01); *E01D 11/00* (2013.01); *E01D 11/02* (2013.01); *E01D 11/04* (2013.01); *F15D 1/004* (2013.01); *F15D 1/10* (2013.01); *F15D 1/12* (2013.01)

(58) Field of Classification Search
CPC ....... E01D 11/00; E01D 11/02; E01D 11/04; E01D 19/16; F15D 1/004; F15D 1/10; F15D 1/12
USPC .................................................. 14/18–23, 78
See application file for complete search history.

(56) References Cited

U.S. PATENT DOCUMENTS 4,059,129 A 11/1977 Feis
4,180,369 A 12/1979 Ottosen
(Continued)

FOREIGN PATENT DOCUMENTS

CN 201068548 Y 6/2008
DE 197 04 759 A1 8/1998
JP H0841823 A 2/1996

OTHER PUBLICATIONS

International Search Report and Written Opinion from International Application No. PCT/EP2013/063655 dated Oct. 21, 2013.
(Continued)

*Primary Examiner* — Raymond W Addie
(74) *Attorney, Agent, or Firm* — Alston & Bird LLP

(57) ABSTRACT

The invention provides a construction comprising a structural element and at least one cable (100) arranged in tension to carry at least a part of the weight of the structural element. The cable defines an outer surface (102) onto which a plurality of strakes (104) form protrusions for reducing rain and wind induced vibrations. Each strake has a height being a distance from a strake root part connected to the outer surface of the cable and a strake end part terminating the strake outwards form the cable, a width being transverse to the height, and a length transverse to the height and width and along which length the strake is connected to the cable. The length of each strake is shorter than the circumference of the outer surface, and the height is less than 5 percent of the diameter of the cable.

11 Claims, 2 Drawing Sheets

(51) Int. Cl.

| | |
|---|---|
| ***E01D 11/02*** | (2006.01) |
| ***E01D 11/04*** | (2006.01) |
| ***F15D 1/12*** | (2006.01) |
| ***F15D 1/00*** | (2006.01) |
| ***F15D 1/10*** | (2006.01) |

(56) References Cited

U.S. PATENT DOCUMENTS

2007/0056384 A1* 3/2007 Yung .................... G01M 10/00 73/807
2007/0125546 A1* 6/2007 Allen ..................... B63B 21/00 166/367
2007/0196181 A1* 8/2007 Tyrer .................... B63B 21/502 248/49
2008/0131210 A1* 6/2008 Wajnikonis ........... B63B 21/502 405/211
2008/0236469 A1* 10/2008 Masters .................... F15D 1/10 114/243
2012/0291687 A1* 11/2012 Dehne ..................... F16L 1/123 114/271

OTHER PUBLICATIONS

International Preliminary Report on Patentability (Chapter II) from International Application No. PCT/EP2013/063655 dated Oct. 15, 2014.
Search Report for corresponding Chinese Application No. 2013800347951 dated Oct. 15, 2015, 2 pages.

* cited by examiner

CONSTRUCTION AND A TENSION ELEMENT COMPRISING A CABLE AND A PLURALITY OF STRAKES

CROSS-REFERENCE TO RELATED APPLICATIONS

This application is a national phase entry of International Appl. No. PCT/EP2013/063655, filed on Jun. 28, 2013, which claims priority to European Appl. No. EP 12174090.6, filed on Jun. 28, 2012, the contents of each of which are incorporated herein in their entirety.

FIELD OF THE INVENTION

The present invention relates to a construction comprising a structural element and at least one cable arranged in tension to carry at least a part of the weight of the structural element. The cable defines an outer surface onto which a plurality of strakes form protrusions for reducing rain and wind induced vibrations.

BACKGROUND OF THE INVENTION

Cables supporting or suspending structures such as antennas and bridges often vibrate due to wind and rain. In the case of cables for bridges, the traffic passing the bridge also contributes to the vibrations however 95 percent of the vibrations are caused by wind and rain. These vibrations are undesirable as they may result in damage on the cables and fatigue.

It is known to try to reduce these vibrations by introducing viscous or frictional dampers to bridge cables or stays. However, such means do not prevent rain-wind induced rivulets. Such rivulets change the aerodynamic profile of the cable which causes the cable to vibrate.

DESCRIPTION OF THE INVENTION

It is an object of embodiments of the present invention to provide an improved construction, an improved tension element, and an improved method for reducing rain and wind induced vibrations.

It is a further object of embodiments of the present invention to reduce or even prevent formation of water rivulets on a cable.

It is an even further object of embodiments of the present invention to reduce rain and wind induced vibrations while simultaneously reducing the drag force.

According to a first aspect, the invention provides a construction comprising a structural element and at least one cable arranged in tension to carry at least a part of the weight of the structural element, the cable defining an outer surface onto which a plurality of strakes form protrusions for reducing rain and wind induced vibrations, wherein each strake has a height being a distance from a strake root part connected to the outer surface of the cable and a strake end part terminating the strake outwards form the cable, a width being transverse to the height, and a length transverse to the height and width and along which length the strake is connected to the cable, the length of each strake being shorter than the circumference of the outer surface, and wherein the height is less than 5 percent of the diameter of the cable.

By designing and arranging the strakes such that length of each strake being shorter than the circumference of the outer surface, and such that the height is less than 5 percent of the diameter of the cable it has been found that the aerodynamic properties of the cable are improved significantly. The reason is that the streamwise vorticity generated by the strake is increased. This is desirable as it reduces the wake formed leeward relative to the cable, which reduces cable drag.

Moreover, it has been found that if the strakes are provided so that they extend in a direction transverse to the longitudinal direction of the cable causes rain-wind generated rivulets to be prevented. Rain-wind generated rivulets formed along the length of a cable changes the cross sectional shape of the cable and thus its aerodynamic properties. This may causes the cable to vibrate.

Additionally, the strakes when positioned transverse to the longitudinal direction of the cable, may inhibit the shedding of large ice/snow fragments, that can generally be assumed to be dangerous for vehicles and persons traversing underneath cables. The transversely arranged strakes may temporarily retain ice/snow formations in place after delamination, due to thermal fluctuations, allowing for the ice/snow to fully or partially melt in place. The strake shape will ensure a discontinuous bonding surface between the ice/snow and the cable sheathing that will lead to the break-up of the ice/snow into smaller pieces, when complete separation of ice/snow occurs from the outer surface of the cable.

In the context of the present invention, the terms ‘cable’ and ‘stay’ shall be seen as synonyms unless otherwise described.

In one embodiment, the cable comprises a predetermined number of strakes for each predetermined length of the cable. As an example the cable may comprise two strakes per meter, such as three strakes per meter, such as four strakes per meter, such as five strakes per meter, such as six strakes per meter, such as eight strakes per meter, such as 10 strakes per meter, such as 15 strakes per meter, such as 20 strakes per meter, such as 25 strakes per meter, such as 30 strakes per meter, such as 35 strakes per meter, such as 40 strakes per meter.

The strakes may be arranged such that a line extending parallel to the centre axis of the cable along the outer surface of the cable extends through a plurality of neighbouring strakes, such as two, such as three, such as four, such as five, such as six, such as seven, such as eight, such as nine, such as 10, such as 15, such as 20, such as 30, such as 40, such as 50, such as 60, such as 70, such as 80, such as 90, such as 100.

In one embodiment, the strakes may be arranged such that for any two neighbouring strakes there exist a first and a second line each of which extends in a direction parallel to the centre axis of the cable along the outer surface of the cable, such that the first line only extends through one of the strakes while the second line extends through both strakes. In the latter embodiment, it will be appreciated that the two strakes overlap each other such when viewed in the direction extending parallel to the longitudinal direction of the cable. In one embodiment 10 percent of the length of one of or both of the strakes overlap, such as 20 percent, such as 30 percent, such as 40 percent, such as 50 percent, such as 60 percent, such as 70 percent, such as 80 percent, such as 90 percent, such as 100 percent.

In one embodiment, the longitudinal direction of one or more of the strakes—such as all the strakes—form an angle with respect to the longitudinal direction of the cable which is within the range 10-90 degrees, such as 10 degrees, such as 15 degrees, such as 20 degrees, such as 25 degrees, such as 30 degrees, such as 35 degrees, such as 40 degrees, such as 45 degrees, such as 50 degrees, such as 55 degrees, such as 60 degrees, such as 65 degrees, such as 70 degrees, such as 75 degrees, such as 80 degrees, such as 85 degrees, such as 90 degrees. In one embodiment, the longitudinal direction of the strakes extends in a direction substantially orthogonal to the longitudinal direction of the outer surface. By substantially in the same direction shall be understood that it may deviate a few degrees, such as +/−5 degrees.

In one embodiment, the length of each strake is less than half of the circumference of the outer surface. In one embodiment, each strake has a length which constitutes less than 75 percent of the circumferential extend of the cable, such as less than 50 percent, such as less than 40 percent, such as less than 30 percent, such as less than 25 percent, such as less than 20 percent, such as less than 15 percent, such as less than 10 percent.

In one embodiment, the length of each of the strakes on the cable is identical. In another embodiment, the cable comprises a first plurality of strakes which has a first length and a second plurality of strakes which has a second length which is different from the first length.

In yet another embodiment, a first plurality of the strakes each has a first length, a second plurality of the strakes each has a second length, and a third plurality of the strakes each has a third length, where the first, the second, and the third lengths are different. In one embodiment, the length of the strakes follows a periodic pattern e.g. in the following manner first length-second length-first length-second length etc. Alternatively the pattern is as follows first length-second length-third length-first length-second length-third length.

In one embodiment, the cable defines a plurality of first cross-sections along which no strakes are defined, and a plurality of second cross-sections along which one or more strakes are defined. Each of these cross sections may extend in a direction orthogonal to the cable. In one embodiment, two strakes are defined in each cross section, such as three strakes, such as four strakes, such five strakes, such as six strakes.

The strakes may be arranged on the outer surface of the cable such that they do not all pass through a longitudinal line which extends along the outer surface and which is parallel to a centre axis of the cable. In one embodiment, the cable comprises a plurality of strakes which are arranged to from a predetermined pattern on the outer surface of the cable. Moreover, the strakes may be arranged such that a first plurality of the strakes forms a first predetermined pattern and a second plurality of the strakes form a second predetermined pattern. The first predetermined patterns may be identical in shape but placed differently on the cable. As an example, the first and the second predetermined pattern may be rotated relative to each other about the centre axis of the cable. As an example the two patterns may be rotated 15 degrees relative to each other about the centre axis of the cable, such as 30 degrees, such as 45 degrees, such as 60 degrees, such as 75 degrees, such as 90 degrees, such as 105 degrees, such as 120 degrees, such as 135 degrees, such as 150 degrees, such as 165 degrees, such as 180 degrees.

If more than one pattern is provided, the two patterns may be identical or different. In one embodiment, a plurality of strakes is arranged to form a helical pattern along the outer surface of the sheath. In a second embodiment, a plurality of strakes is arranged to form a periodic pattern along the outer surface of the sheath. In one embodiment, the periodic pattern is a wave pattern, such as a sinus pattern.

The strakes in each predetermined pattern may have the same angular orientation relative the centre axis of the cable. As an example the may all define an angle of 90 degrees relative to the centre axis of the cable. Alternatively, the strakes may be arranged differently relatively to the centre axis of the cable. In embodiment, a first plurality of the strakes have a first orientation relative to the centre axis of the cable, while a second plurality of the strakes have a second orientation, which is different from the first orientation. In one embodiment any two neighbouring strakes does not have the same orientation relative to the centre axis of the cable. In one embodiment any two strakes which are defined in the same cross section does not have the same orientation relative to the centre axis of the cable.

Moreover, the strakes which form a predetermined pattern may extend in a direction parallel to this predetermined pattern. In an alternative embodiment, each of the strakes extends in a direction transverse to the predetermined pattern, e.g. such that they form an angle relative to a general direction of the predetermined pattern of e.g. 15 degrees, such as 30 degrees, such as 45 degrees, such as 60 degrees, such as 75 degrees, such as 90 degrees. As an example, the plurality of strakes may extend in a direction orthogonal to the length of the cable, while at the same time forming a helical pattern along the outer surface of the cable.

The cable may be adapted for outdoor use where it is subjected to wind and rain. The cable may be suitable for supporting a mast and/or for suspending a structure such as a bridge or a platform, i.e. the construction according to the first aspect of the invention may comprise a structural element in the form of a bridge or a platform, and at least one cable arranged in tension to carry at least a part of the weight of this structural element. When the cable is used in connection with bridges, the cable may be called a suspension cable. However, the use of the word 'suspension' shall not limit the invention to suspension bridges but rather cover any cable which is used for suspending a structure such as a bridge. As an example, the cable may be used in connection with cable stayed bridges. Moreover, the cable according to the present invention may be a main cable or a suspender cable of a suspension bridge. Moreover, the cable may be an inclined cable e.g. for a cable stayed bridge.

The cable may be formed by a solid material such as a cylindrical solid wire. Moreover, the cable may comprise a plurality of strands which may be braided or twisted relative to each other. As an example, the cable may be a wire rope comprising strands which are twisted into a helix. The number of strands may be one or a plurality such as two, three, four, five, six, seven, eight, nine, ten or 15 or 20. In case of a plurality of strands, the strands may extend parallel to each other or the strands may be twisted or braided.

The outer surface of the cable may be untreated/raw or smooth. A sheath may be provided around the strands e.g. so as to create the smooth outer surface. By smooth shall be understood that the surface is smooth in areas where the strakes are not formed. The sheath may serve as a corrosion protection of the cable. In one embodiment, the sheath creates a non-smooth outer surface e.g. into which a plurality of indentations are provided. The non-smooth outer surface of the sheath may be untreated/raw or purposely manufactured so as to provide this non-smooth outer surface.

The strakes extend radially away from the cable (relative to the geometrical centre of the cable) so as to form a protrusion or projection or ridge. Longitudinally, the strakes may extend along the outer surface of the cable.

The plurality of strakes may form separate elements which are secured or fastened to the outer surface of the cable. The strakes may be secured/attached to the outer surface of the cable by means of an adhesive. Alternatively, or as a supplement, a fastening element may be provided for securing the stake to the outer surface. One example of such a fastening element is a clamps or a plurality of clamps.

In one embodiment, the plurality of strakes is attached to the cable such that it may be detached and re-attached to the cable.

In one embodiment, the plurality of strakes is permanently secured to the cable. By permanently secured shall be understood that the strake cannot be removed from the cable without permanently damaging the strake and/or the cable. In one example, the strakes are secured to the cable by means of welding e.g. by means of ultrasound welding.

In one embodiment, the plurality of strakes form an integral part of the cable or a sheath formed around the cable. By 'form an integral part' shall be understood that the strake and the cable/sheath form one unitary element, e.g. by forming the cable and the strakes in one piece. In one embodiment, the strake and the cable/sheath form a monolithic element. The term 'monolithic element' shall in the context of the present invention be understood such that no seams (e.g. welding seams) may be defined between the cable and the strake.

Thus, it should be understood, that the term "connected to the outer surface" covers both that the at least one strake is a separate element being attached to the outer surface of the cable and that the at least one strake in another embodiment is formed in one piece with the cable.

In the context of the present invention, the term 'strake root part' shall designate that part of the strake which is closest to the outer surface of the cable. In embodiments wherein the strake forms a separate element which is secured to the outer surface of the cable, the strake root part contacts the outer surface of the cable. In embodiments where the strake and the cable/sheath forms an integral product or define a monolithic element, the strake root part shall be defined by a transition between the cable and the strake.

The 'strake end part' on the contrary defines the free end of the strake, i.e. the end terminating the strake outwards away from the cable.

In the context of the present invention, the term 'height' when used in relation to the strakes shall designate that dimension of the strakes which extends in a direction parallel to the radius of the cable onto which it is connected, i.e. the distance between the strake end part and the strake root part in a direction perpendicular to the outer surface of the cable. This height is less than 5 percent of the diameter of the cable.

In the context of the present invention, the term 'width' when used in relation to the strakes shall designate that dimension of the strakes which extend transverse to the height of the strake. The width of the strakes may be decreasing in the direction from the strake root part towards the strake end part.

In the context of the present invention, the term 'length' when used in relation to the strakes shall designate the longest dimension of the strakes, the length being transverse to both the height and the width. The plurality of stakes is connected to the cable along the length of the strakes.

The strake and/or the cable may comprise a metal material such as steel, copper, stainless steel, aluminium, zinc. Moreover, the strake and/or the cable may comprise plastic material such as PVC, PE, HDPE; and/or a rubber material such as natural or synthetic rubber; and/or a composite material e.g. comprising glass fibres, carbon fibres, vectran.

The height of the plurality of strakes is less than 5 percent of the diameter of the cable, such as less than 4 percent, such as less than 3 percent, such as less than 2 percent, such as less than 1 percent, such as less than 0.5 percent, such as less than 0.4 percent, such less than 0.3 percent, such less than 0.2 percent, such as less than 0.1 percent.

The height of the strakes may be below 10 mm, such as below 9 mm, such as below 8 mm, such as below 7 mm, such as below 6 mm, such as below 5 mm, such as below 4 mm, such as below 3 mm, such as below 2 mm, such as below 1 mm.

The widest part of the strake may constitute 0.1-5 percent of the circumference of the cable, such as 0.1 percent, such as 0.5 percent, such as 1 percent, such as 2 percent, such as 3 percent, such as 4 percent, such as 5 percent The widest part of the strake may be in the range of 0.1-25 mm, such as 1 mm, such as 2.5 mm, such as 5 mm, such as 7.5 mm, such as 10 mm, such as 12.5 mm, such as 15 mm, such as 17.5 mm, such as 20 mm, such as 22.5 mm, such as 25 mm.

The diameter of the cable may be 50-350 mm, such as above 50 mm, such as above 100 mm, such as above 150 mm, such as above 200 mm, such as above 250 mm, such as above 300 mm, such as above 350 mm.

In one embodiment, the cable comprises at least one strand housed in a sheath which defines the outer surface of the suspension cable. In one embodiment, the outer surface or the cable is substantially smooth.

The plurality of strakes may comprises a strake surface portion facing away from the cable, which strake surface portion may be concave or straight, whereby the strake has a shape which when the wind flows along the outer surface of the cable, reduces any water present on this outer surface of the cable as it will be deflected from the surface by ramping of the rain due to the strake surface being straight or concave. The effect is that the formation of rain rivulets on the cable is prevented. This improves the aerodynamic properties of the cable, whereby rain and wind induced vibrations are minimized.

To facilitate ramping of water rivulets from the cable, the strake surface portion being concave or straight may extend from the strake root part to the strake end part, thereby providing a ramp for rivulets flowing along the outer surface of the cable.

Thus, the concave or straight surface portion may be arranged so that it faces away from the cable, such that the wind may move the water along the outer surface of the cable and further onto the concave or straight surface portion. In one particular embodiment, the concave or straight surface portion in at least one point (e.g. the centre point) defines a tangent which coincides with a tangent of the outer surface of the cable. Furthermore, the concave surface portion may define a tangent at the strake root being smaller than or equal to a tangent at the strake end.

Since cables may be exposed to wind from all directions, the plurality of strakes may be arranged relative to the cable such that the forces acting on the cable and the strakes are independent on a wind direction, thereby resulting in an omnidirectional solution, i.e. a cable with strakes having a performance being substantially independent of wind direction. If this is not fulfilled, the cable with the plurality of strakes may appear asymmetric at certain wind directions which may introduce the risk for Den Hartog galloping vibrations. Once a cable moves/vibrates transversely to the oncoming wind, the instantaneous wind angle of attack changes periodically. Combined with the fact that the aerodynamic forces also depend on the angle of attack, some unlucky combinations can occur where energy is constantly feed into the vibration. Consequently, the vibration amplitudes can become very large and severe.

According to a second aspect, the invention provides a tension element for carrying at least a part of a structural element, the tension element comprising a cable and a plurality of strakes, the cable defining an outer surface onto which the plurality of strakes form protrusions for reducing rain and wind induced vibrations, wherein each strake has a height being a distance from a strake root part connected to the outer surface of the cable and a strake end part terminating the strake outwards form the cable, a width being transverse to the height, and a length transverse to the height and width and along which length the strake is connected to the cable, the length of each strake being shorter than the circumference of the outer surface, and wherein the height is less than 5 percent of the diameter of the cable.

The tension element according to the second aspect of the invention may comprise any combination of features and/or elements of the invention according to the first aspect.

According to a third aspect, the invention provides a method for reducing rain and wind induced vibrations in a cable which carries at least a part of the weight of a structural element in a construction, the method comprising the steps of:

providing a plurality of stakes, each having a length being shorter than the circumference of the cable; and connecting the plurality of strakes to an outer surface of the cable.

It should be understood, that the method for reducing rain and wind induced vibrations may be used in connection with the construction according to the above-described first aspect of the invention may and in connection with the tension element according to the above-described second aspect of the invention. Thus, the features of the first and second aspects of the invention may be applicable in relation to the method for reducing rain and wind induced vibrations of the third aspect of the invention.

BRIEF DESCRIPTION OF THE DRAWINGS

Embodiments of the invention will now be further described with reference to the drawings, in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
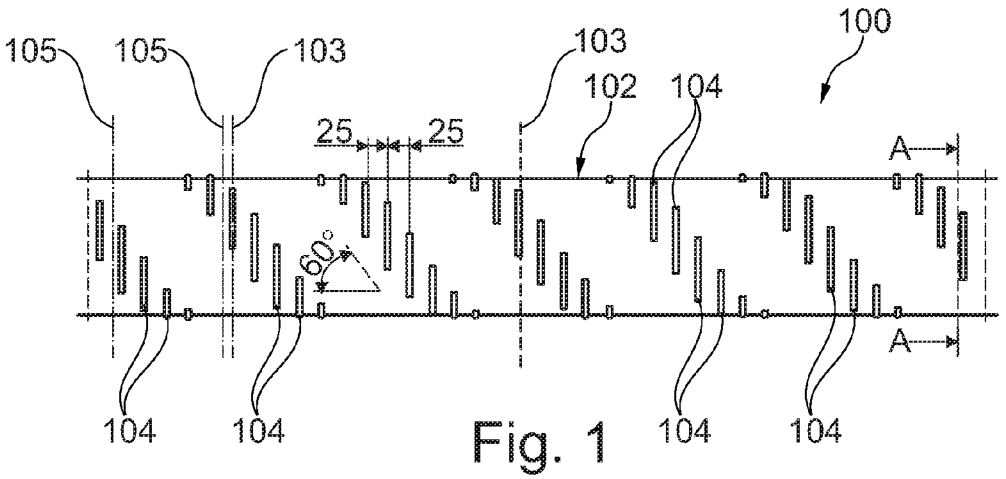
FIG. 1 discloses a cable according to a first embodiment of the invention.
Figure 2:
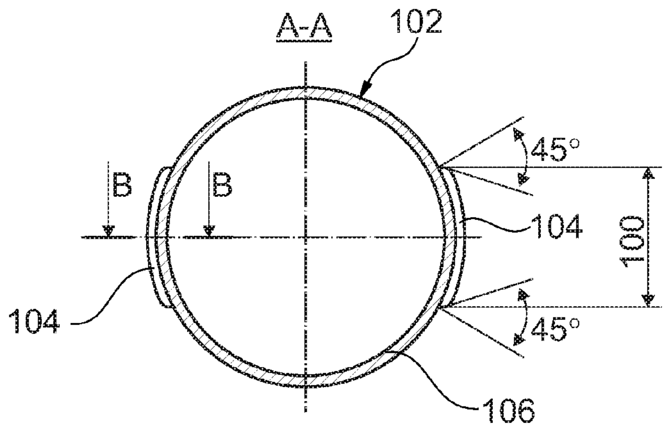
FIG. 2 discloses a cross-section of the cable of FIG. 1.
Figure 3:
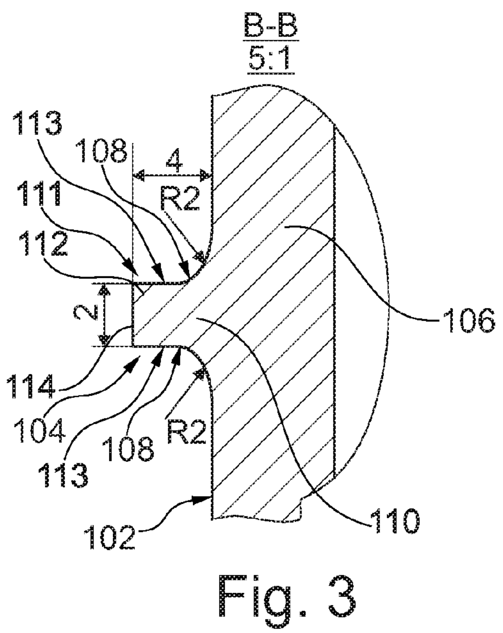
FIG. 3 discloses a cross-section of the of the strakes of the first embodiment, FIG. 4 discloses a cross-section of a second embodiment, and FIG. 5 discloses a cross-section of a third embodiment.

FIG. 1 discloses a cable 100 defining an outer surface 102. In the embodiment of the figures a sheath (see. FIG. 2) is provided on the cable and this sheath defines the outer surface 102 of the cable. A plurality of strakes 104 is provided on the outer surface 102 of the cable. Each of the strakes extends in a direction transverse to the longitudinal direction of the cable 100. In FIG. 1 each of the strakes 104 extend in a direction orthogonal to the longitudinal direction of the cable. Moreover each of the strakes 104 may extend around only a part of the circumference of the cable such that each of the strakes covers only a $6^{th}$ of the circumference. Together the strakes form a helical pattern around the cable. It will be appreciated that in FIG. 1, the strakes 104 are provided in two helical patterns. The cable defines a first plurality of cross sections 103 (indicated by the dashed line) which extend though two strakes (one from each of the two helical patterns) and a second plurality of cross sections 105 (indicated by the dash-dotted lines) through which do not extend through any strake. Any two neighbouring strakes in the same helical pattern overlap and are spaced apart by a predetermined distance—in the figure any two neighbouring strakes are spaced apart by 25 millimeters. In the embodiment of FIGS. 1-3 the length of each of the strakes is 100 mm. Moreover as may be seen from the figures, the ends of each strake define an inclined angle of 45 degrees relative to a line which extends in the radial direction of the cable and extends through the tip of the strike. The provision of the inclined surface of the strakes causes the drag of the cable to be reduced.

Furthermore in the embodiment, FIGS. 1-3, the pitch angle of each of the helical patterns is 60 degrees relative to the longitudinal direction of the cable.

FIG. 2 discloses a cross section of the cable corresponding to the section A-A in FIG. 1. In the figure the sheath 106 is visible. Inside the sheath 106 the cable is provided. As it may be seen in the figure, each of the strakes 104 does not extend around the entire outer surface 102 of the sheath 106.

A cross section of one strake 104 (corresponding to section B-B in FIG. 2) is visible in FIG. 3. It will be appreciated from the figure, that concave surfaces 108 are defined on both sides of the strake 104. The concave surfaces face in opposite directions and are located close to the strake root part 110, while a linear part 111 is located close to the strake end part 112. The linear part 111 defines linear side surfaces 113. Accordingly, each of the two radial side surfaces defines a concave surface 108 and a linear side surface 111. In the embodiment of FIG. 3, the end surface 114 is substantially flat. However in other embodiments, the end surface may be round or sharp.

Figure 4:
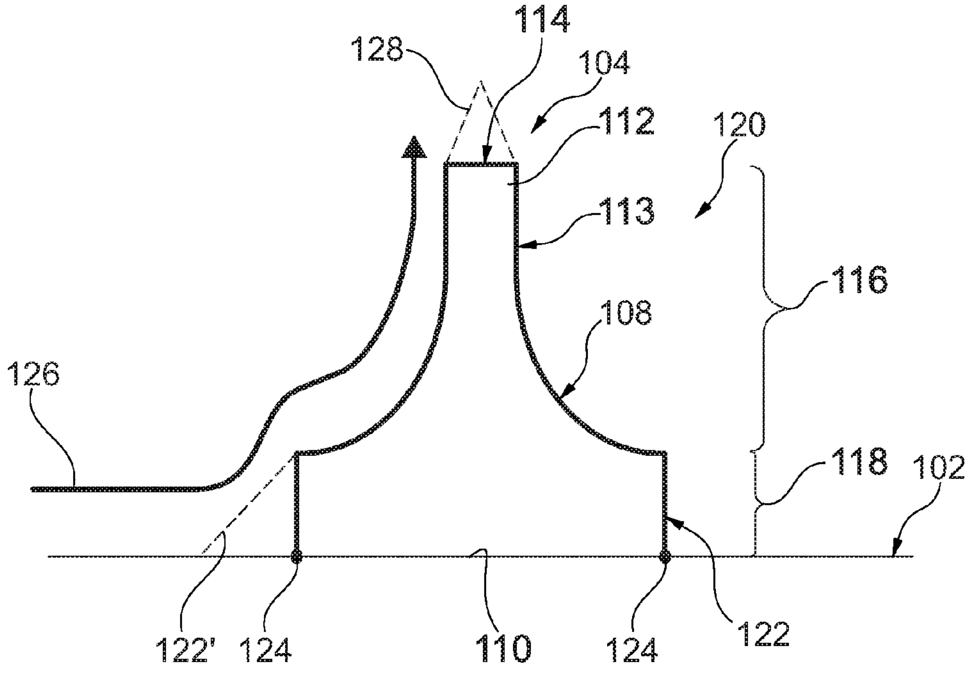
Figure 5:
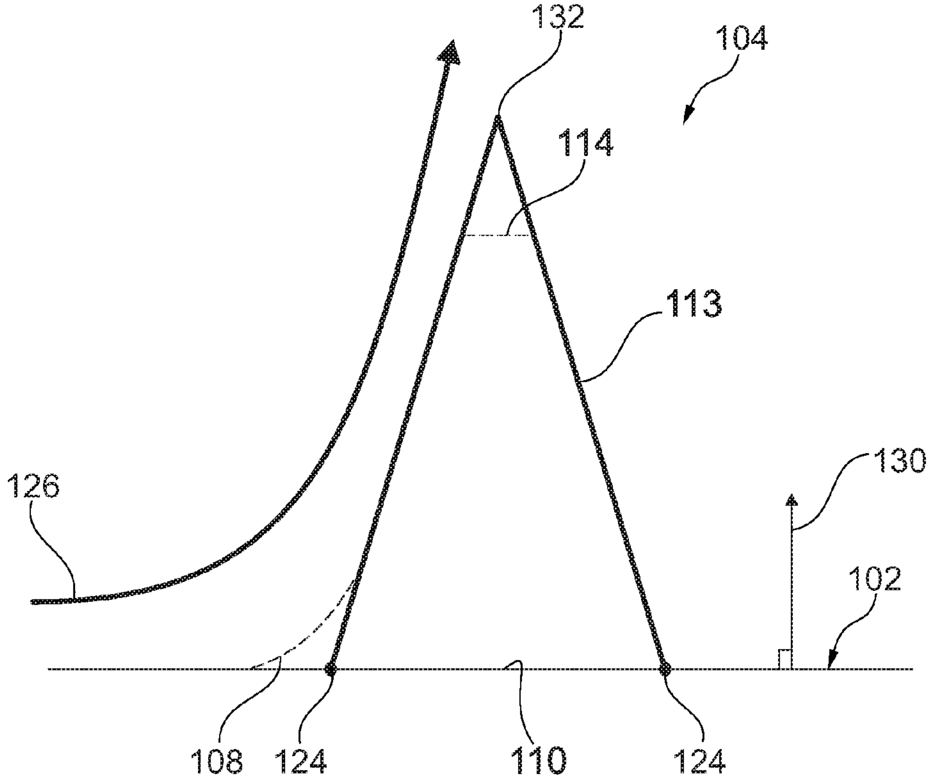

FIGS. 4 and 5 disclose two cross sections of the strake 104. In both cases the strakes 104 are illustrated as being fastened/formed on a straight surface, however it will be appreciated that most cables will have a round surface.

Initially the shape of the strake 104 in FIG. 4 is discusses disregarding the dotted lines (which disclose alternative shapes). The strake 104 comprises a concave part 116 and a transition part 118. The concave part is located closer to the strake end part 112 and the transition part 118 is located closes to the strake root part 110. The strake defines two radial side surface 120 each of which is defined by a linear side surface 113, a concave surface 108 and a transition surface 122 (which is linear in the figure). The strake extend from a contact point 124 defined on the outer surface 102. The strake end part 114 in the embodiment of FIG. 4 is flat.

When water flows along the outer surface 102—as indicated by arrow 126—it initially flows into contact with the transition surface 122 and further up along the concave surface 108 and subsequently onto the linear surface 113 and finally leaves the strake. Any water droplet contained on the outer surface flows along these surfaces and due to the concave surface it is forced away from the outer surface 102 of the strake. It will be appreciated that if the transition surface is inclined relative to the outer surface 102 (as indicated by the inclined transition surface 122') it will be guided onto the concave surface 108 instead of being halted by the transition surface 122 which extend in a direction orthogonal to the outer surface 102. Moreover, there is a risk that water droplets are collected on the flat end part 114, and thus the sharper it is the lower is the risk of such collection of water. In one embodiment the end part is sharp as indicated by dotted lines 128.

FIG. 5 discloses an alternative where the strake 104 has a triangular cross section. Accordingly, neither a transition part 118 nor a concave part 108 is defined. The linear side surface 113, extend in a direction transverse to the outer surface 102 and is non-parallel to a normal 130 defined on the outer surface 102 the cable. It will be appreciated that when the cable is circular this normal 130 extend in the radial direction of the cable.

A concave surface may be defined to guide the droplets on to the strake 104. It will be appreciated that such a concave surface 108 will function as a ramp.

In FIG. 5 the strake defines a tip 132 however in other embodiments a flat or concave end surface 114' may be defined as indicated by the dotted line 114'.

EMBODIMENTS

Embodiment 1

A cable or stay defining an outer surface onto which at least one strake is provided, the strake defining a longitudinal direction which extends in a direction transverse to a longitudinal direction of the cable or stay and wherein a length of the strake is shorter than the circumference of the outer surface.

Embodiment 2

A cable or stay according to embodiment 1, wherein the longitudinal direction of the strake extends in a direction substantially orthogonal to the longitudinal direction of the outer surface.

Embodiment 3

A cable or stay according to embodiment 1, wherein the length of each strake is less than half of the circumference of the outer surface.

Embodiment 4

A cable or stay according to any of the preceding embodiments, wherein the cable or stay defines a plurality of first cross-sections along which no strakes are defined, and a plurality of second cross-sections along which one or more strakes are defined.

Embodiment 5

A cable or stay according to any of the preceding embodiments, comprising a plurality of strakes which are arranged to form a predetermined pattern on the outer surface of the sheath.

Embodiment 6

A cable or stay according to embodiment 5, wherein the plurality of strakes is arranged to form a helical pattern along the outer surface of the sheath.

Embodiment 7

A cable or stay according to embodiment 5, wherein the plurality of strakes is arranged to form a periodic pattern along the outer surface of the sheath.

Embodiment 8

A cable or stay according to any of embodiments 5-7, wherein each of the strakes extends in a direction transverse to the predetermined pattern.

Embodiment 9

A cable or stay according any of the preceding embodiments, wherein the cable is adapted to be used in supporting a bridge.

Embodiment 10

A cable or stay according to any of the preceding embodiments, wherein the cable comprises at least one strand housed in a sheath which defines the outer surface of the cable or stay.

Embodiment 11

A cable or stay according to any of the preceding embodiments, wherein the outer surface is substantially smooth.

Embodiment 12

A strake for use in the cable or stay according to any of the preceding embodiments.

The invention claimed is:

1. A construction comprising a structural element and at least one cable arranged in tension to carry at least a part of the weight of the structural element, the cable defining an outer surface onto which a plurality of strakes form protrusions for reducing rain and wind induced vibrations, wherein each strake has a height being a distance from a strake root part connected to the outer surface of the cable and a strake end part terminating the strake outwards form the cable, a width being transverse to the height, and a length transverse to the height and width and along which length the strake is connected to the cable, the length of each strake being shorter than the circumference of the outer surface, wherein the height is less than 5 percent of the diameter of the cable, and wherein the longitudinal direction of the strake extends in a direction substantially orthogonal to the longitudinal direction of the outer surface.

2. A construction according to claim 1, wherein the length of each strake is less than half of the circumference of the outer surface.

3. A construction according to claim 1, wherein the cable defines a plurality of first cross-sections along which no strakes are defined, and a plurality of second cross-sections along which one or more strakes are defined.

4. A construction according to claim 1, wherein a plurality of strakes are arranged to form a predetermined pattern on the outer surface of the cable.

5. A construction according to claim 4, wherein the plurality of strakes is arranged to form a helical pattern along the outer surface of the cable.

6. A construction according to claim 4, wherein the plurality of strakes is arranged to form a periodic pattern along the outer surface of the sheath.

7. A construction according to claim 4, wherein each strake extends in a direction transverse to the predetermined pattern.

8. A construction according to claim 7, wherein the cable comprises at least one strand housed in a sheath which defines the outer surface of the cable.

9. A construction according to claim 1, wherein the outer surface is substantially smooth.

10. A tension element for carrying at least a part of a structural element, the tension element comprising a cable and a plurality of strakes, the cable defining an outer surface onto which the plurality of strakes form protrusions for reducing rain and wind induced vibrations, wherein each strake has a height being a distance from a strake root part connected to the outer surface of the cable and a strake end part terminating the strake outwards form the cable, a width being transverse to the height, and a length transverse to the height and width and along which length the strake is connected to the cable, the length of each strake being shorter than the circumference of the outer surface, wherein the height is less than 5 percent of the diameter of the cable, and wherein the longitudinal direction of the strakes extends in a direction substantially orthogonal to the longitudinal direction of the outer surface.

11. A method for reducing rain and wind induced vibrations in a cable which carries at least a part of the weight of a structural element in a construction, the method comprising the steps of:

providing a plurality of stakes, each having a length being shorter than the circumference of the cable;

arranging the strakes so that the longitudinal direction of the strakes extends in a direction substantially orthogonal to the longitudinal direction of the cable, and connecting the plurality of strakes to an outer surface of the cable, wherein a height of the at least one strake is less than 5 percent of the diameter of the cable.

* * * * *